March 2, 1965     M. L. BENJAMIN ET AL     3,171,666
POSITIVE DRIVE CHUCK
Filed Dec. 14, 1962

INVENTORS
MILTON L. BENJAMIN &
CLIFFORD H. BROWNSELL
BY
Oberlin, Maky & Donnelly
ATTORNEYS

United States Patent Office 3,171,666
Patented Mar. 2, 1965

3,171,666
POSITIVE DRIVE CHUCK
Milton L. Benjamin, Shaker Heights, and Clifford H. Brownsell, Chagrin Falls, Ohio, assignors to Erickson Tool Company, Solon, Ohio, a corporation of Ohio
Filed Dec. 14, 1962, Ser. No. 244,782
3 Claims. (Cl. 279—93)

This invention relates generally to collet type chucks, and more particularly to a positive drive collet type chuck for releasably holding various cutting tools in the chuck for rotation therewith.

In known collet type chucks, the tool, such as a tap, reamer, or milling cutter, is generally provided with a square or like tang at its shank end which is inserted into a tool driver in the chuck body. However, the tool driver usually is not axially adjustable, and even if it is so adjustable, the tool is pushed axially outward of the chuck but not pulled axially inward.

It is a primary object of this invention to provide a positive drive connection between the tool shank and the chuck whereby the tool is positively adjusted both axially inward and outward and hence more efficiently driven by the rotating chuck.

A further object of the invention is to prevent premature or inadvertent removal of the tool from the chuck by providing a novel connection which locks the tool axially in place in the chuck in a very simple manner, such locking preventing removal of the tool from the chuck until the tool is manually disconnected or unlocked from the chuck and removed therefrom.

Yet another object of the invention is to provide an adjustable, positive stop means associated with the chuck for positively stopping the end of the tool shank when the same is in position for effecting the positive drive connection between the tool and the chuck.

Other objects and advantages of the present invention will become apparent as the following description proceeds.

To the accomplishment of the foregoing and related ends, the invention, then, comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 1:
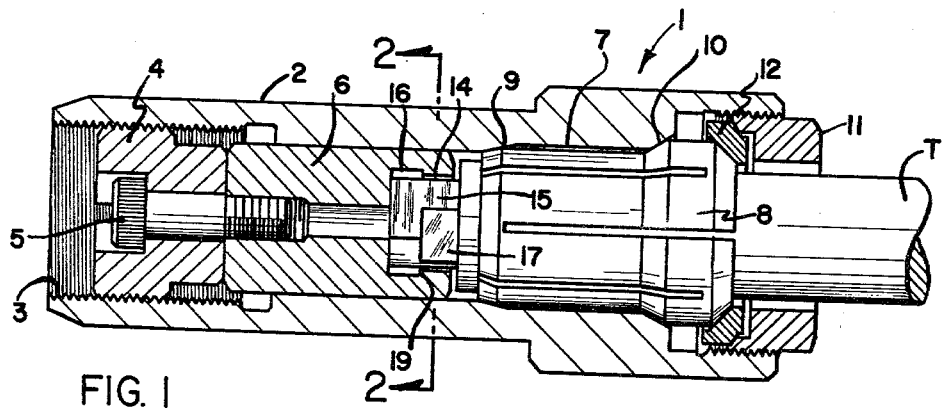
FIG. 1 is a longitudinal cross sectional view of the chuck body and tool shank disposed therein, illustrating the positive drive connection according to the present invention.

Referring now to the drawings, the chuck body 1 has an elongated stem or shank portion 2 which is adapted to be mounted in the spindle or turret of a metal working machine. The shank portion 2 is provided with internal threads 3 for threadedly receiving an adjustable stop screw 4, the latter, when turned in opposite direction, being effective through shoulder screw 5 to axially adjust the drive member 6 in opposite directions in said body 1.

The opposite or front end of the chuck body 1 is formed in the usual manner with a collet-receiving bore 7 for receiving a collet 8. The bore 7 is provided with a pair of spaced frusto-conical cam surfaces 9 and 10 for radially contracting the collet 8 when the latter is urged axially into the chuck body 1 by nosepiece 11 and nose ring 12. It is now apparent that the tightening of the nosepiece 11 will cause the collet 8 to be contracted radially inwardly to effectively grip a tool inserted therethrough, such tool being designated by the reference character T in FIG. 1.

Figure 2:
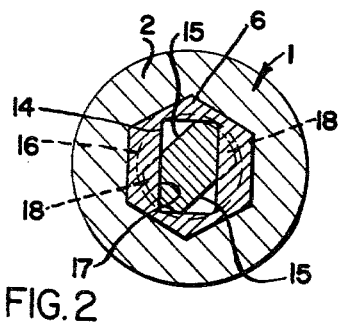
FIG. 2 is a vertical cross sectional view taken on lines 2—2 of FIG. 1.
Figure 3:
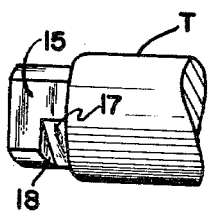
FIG. 3 is a perspective view of the inner end portion of the tool shank.

The drive member 6 is hexagonal in cross section as can be seen in FIG. 2 and the chuck body 1 is provided with a hexagonal shaped opening for receiving the drive member 6 whereby such member 6 is nonrotatable relative to the chuck body 1. The inner end of the drive member 6 is provided with a generally rectangular opening 14 through which the shank end of the tool T with parallel flat sides 15 is adapted to be inserted. Axially adjacent to the opening 14 is a cylindrical recess 16 of diameter approximately equal to, or slightly greater than, the height of the opening 14.

In order to lock the tool T in place in the chuck body 1 and thereby to positively drive the tool T, the latter has parallel flats 17 obliquely disposed relative to flats 15 to permit rotation of the tool T to hook the portions 18 behind the shoulder 19 between recess 16 and opening 14. The tool T is positively driven by engagement of flats 17 with opposite sides of opening 14 as clearly shown in FIG. 2.

When the tool T is inserted through the collet 8, such inward movement will be limited by the contacting of the inner end of the tool T with the bottom of recess 16. It will also be seen that in order to so position the shank of the tool T the flats 15 thereof must be aligned with opposite sides of opening 14. It will further be seen that when the tool shank is so positioned, rotation thereof 45° in a clockwise direction, as viewed in FIG. 2, will cause the tool T to become axially and rotatably locked in the drive member 6 due to engagement of flats 17 with opening 14 and of portions 18 with shoulder 19. Once the tool T has been so inserted and rotated the nosepiece 11 is then turned to force the collet 8 axially inward against cam surfaces 9 and 10 whereby the collet 8 is radially contracted into firm gripping engagement with tool T.

As previously explained, the adjusting screw 4, when turned in opposite directions, will move the drive member 6, and the tool engaged therewith, axially in opposite directions.

When it is desired to remove the tool T from the chuck body 1, the nosepiece 11 is unscrewed thereby relieving the axial pressure on the collet 8 enabling the latter to expand radially away from the tool T. The tool T is then rotated 45° in a direction opposite to the original direction of rotation for locking the tool T, thereby aligning the flats 15 with the opposite sides of opening 14. The tool T can then be withdrawn axially from the chuck body 1.

It will thus be seen that the invention comprises a novel positive drive connection between the tool shank and the chuck whereby the tool T is more effectively positively driven by the rotating chuck. Further, the tool shank can be locked axially in place thereby preventing the inadvertent removal of the tool T from the chuck body 1.

Other modes of applying the principle of the invention may be employed, change being made as regards the details described, provided the features stated in any of the following claims or the equivalent of such be employed.

We therefore particularly point out and distinctly claim as our invention:

1. In a tool chuck for releasably securing a tool therein for rotation therewith comprising a chuck body having a collet receiving end portion, a drive member mounted in said body, said drive member and said body having complemental polygonal portions for preventing rotation but permitting relative axial movement therebetween, means for axially adjustably moving said drive member in said body, radially contractible collet means disposed in said body, means for contracting said collet means thereby effecting a firm engagement thereof with a portion of a tool therein, the inner end of said tool and said drive member having complemental interlocking portions to permit axial insertion and turning of said inner end of said tool in said drive member for securing them together against relative rotary and axial movements.

2. The combination of claim 1 wherein said means for axially adjustably moving said drive member in said body comprises an adjusting screw threadedly received in said body, said screw having a rotatable, but axially fixed connection with said drive member whereby rotation of said adjusting screw in opposite directions effects axial movement of said drive member in opposite directions relative to said chuck body.

3. The combination of claim 1 wherein said drive member is formed with a first opening of non-circular cross-section and an axially adjacent opening of circular cross-section, said inner end of said tool is formed with a pair of opposed planar surfaces complemental with said first opening of said drive member, said inner end further including a second pair of spaced planar surfaces offset from said first mentioned opposed planar surfaces whereby insertion of said tool through said first and second openings and subsequent rotation thereof rotatably and axially locks said tool in said drive member.

References Cited by the Examiner
UNITED STATES PATENTS

| 2,182,411 | 12/39 | Rosenberg | 40—130 |
| 2,219,907 | 10/40 | Ross | 279—93 |
| 2,379,984 | 7/45 | Nereauz | 279—93 |
| 2,570,752 | 10/51 | Benjamin | 279—16 |
| 3,052,999 | 9/62 | Sedgwick | 40—2.2 |

FOREIGN PATENTS 527,750  6/31  Germany.

ROBERT C. RIORDON, *Primary Examiner.*
FRANK SUSKO, *Examiner.*